US012088602B2

(12) United States Patent
Kazato (10) Patent No.: US 12,088,602 B2
(45) Date of Patent: Sep. 10, 2024

(54) ESTIMATION APPARATUS, ESTIMATION METHOD AND PROGRAM

(71) Applicant: Nippon Telegraph and Telephone Corporation, Tokyo (JP)

(72) Inventor: Yuta Kazato, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 548 days.

(21) Appl. No.: 17/432,212

(22) PCT Filed: Feb. 12, 2020

(86) PCT No.: PCT/JP2020/005377
§ 371 (c)(1),
(2) Date: Aug. 19, 2021

(87) PCT Pub. No.: WO2020/170911
PCT Pub. Date: Aug. 27, 2020

(65) Prior Publication Data
US 2023/0008765 A1    Jan. 12, 2023

(30) Foreign Application Priority Data
Feb. 20, 2019  (JP) ................................. 2019-028716

(51) Int. Cl.
*H04L 29/06*      (2006.01)
*H04L 9/40*       (2022.01)

(52) U.S. Cl.
CPC ...... *H04L 63/1416* (2013.01); *H04L 63/1425* (2013.01); *H04L 63/20* (2013.01)

(58) Field of Classification Search
None
See application file for complete search history.

(56) References Cited

FOREIGN PATENT DOCUMENTS

EP    4102385 A1 * 12/2022 ....... G06F 16/24578

OTHER PUBLICATIONS

Thomas N. Kipf, Max Welling; "Semi-Supervised Classification with Graph Convolutional Networks", ICLR 2017, p. 1-14. (Year: 2017).*

(Continued)

*Primary Examiner* — Jeffery L Williams
(74) *Attorney, Agent, or Firm* — Fish & Richardson P.C.

(57) ABSTRACT

An estimation device includes: a collection section configured to collect related information when cyber threat intelligence of a maliciousness estimation target is input, the related information being related to the cyber threat intelligence and other cyber threat intelligence different from the cyber threat intelligence; a feature generation section configured to generate a feature based on the related information, the feature representing a feature of the cyber threat intelligence; a graph information generation section configured to generate graph information based on the related information and the other cyber threat intelligence, the graph information indicating a graph in which each of the cyber threat intelligence and the other cyber threat intelligence is a node and a relationship between the nodes is an edge; and an estimation section configured to estimate the maliciousness of the cyber threat intelligence by a graph convolutional neural network using the feature of the cyber threat intelligence when a graph indicated by the graph information has a graph structure between the cyber threat intelligence and the other cyber threat intelligence.

12 Claims, 3 Drawing Sheets

(56) References Cited

OTHER PUBLICATIONS

Lu, L. et al. (2009). Ranking Attack Graphs with Graph Neural Networks. In: Bao, F., Li, H., Wang, G. (eds) Information Security Practice and Experience. ISPEC 2009. Lecture Notes in Computer Science, vol. 5451. Springer, Berlin, Heidelberg. https://doi.org/10.1007/978-3-642-00843-6_30 (Year: 2009).*

Boukhtouta et al., "Graph-theoretic characterization of cyber-threat infrastructures," Digital Investigation DFRWS USA, 2015, 14:S3-S15.

Kazato et al., "Detecting Malicious Domains with Probabilistic Threat Propagation of DNS Graph," Computer Software, 2016, 33(3):16-28.

Wang et al., "Poster: An Approach to Verifying Threat Intelligence Based on Graph Propagation," 39th IEEE Symposium on Security and Privacy, May 21, 2018.

* cited by examiner

ESTIMATION APPARATUS, ESTIMATION METHOD AND PROGRAM

CROSS-REFERENCE TO RELATED APPLICATIONS

This application is a National Stage application under 35 U.S.C. § 371 of International Application No. PCT/JP2020/005377, having an International Filing Date of Feb. 12, 2020, which claims priority to Japanese Application Serial No. 2019-028716, filed on Feb. 20, 2019. The disclosure of the prior application is considered part of the disclosure of this application, and is incorporated in its entirety into this application.

TECHNICAL FIELD

The present disclosure relates to an estimation device, an estimation method, and a program.

BACKGROUND ART

In recent years, security operations utilizing cyber threat intelligence (CTI) have been performed. Cyber threat intelligence is information that can be utilized for security operations such as attack detection and countermeasures by collecting and storing information about attackers, attack purposes, attack methods, and the like related to cyber attacks and threats and analyzing the information. Examples of the cyber threat intelligence include internet protocol (IP) addresses and domain names used by attackers, indicator of compromise (IoC) information such as uniform resource locators (URLs), information about countermeasures against attacks (Course of Action), malware hash values, and the like.

Maliciousness is known as an index of such cyber threat intelligence and is used for determining the priority of the cyber threat intelligence, making a decision, and the like. Maliciousness is an index indicating the degree of likelihood that cyber threat intelligence such as a domain name or URL is used in a cyber attack and is represented by, for example, the probability that the cyber threat intelligence is malicious. Therefore, more prompt and accurate security operations and the like can be performed as the accuracy of maliciousness increases. Additionally, examples of information sources of cyber threat intelligence include cyber threat intelligence providing services of security companies, alert information from an attack detection device that detects attack communication, open-source intelligence (OSINT), and the like.

As a conventional technique for calculating the maliciousness of cyber threat intelligence, a technique for estimating maliciousness according to a graph analysis method using a graph setting cyber threat intelligence as a "node" and a connection between the related pieces of cyber threat intelligence as an "edge" is known. For example, a technique for calculating maliciousness using a PageRank method (Non Patent Literature 1) and a technique for estimating maliciousness by a graph propagation method (Non Patent Literature 2) are known. Further, a technique for calculating a threat score using a probability propagation method on a bipartite graph is also known (Non Patent Literature 3).

CITATION LIST

Non Patent Literature

Non Patent Literature 1: Boukhtouta, Amine, et al. "Graph-theoretic characterization of cyber-threat infrastructures." Digital Investigation 14 (2015): S3-S15

Non Patent Literature 2: WANG, Xin, et al. "Poster: An Approach to Verifying Threat Intelligence Based on Graph Propagation." IEEE S&P 2018 Poster Non Patent Literature 3: "Detecting Malicious Domains with Probabilistic Threat Propagation on DNS Graph" Yuta Kazato, Kensuke Fukuda, and Toshiharu Sugawara, Computer Software 33.3 (2016): 3_16-3_28.

SUMMARY OF THE INVENTION

Technical Problem

However, in the existing technology, because the features of cyber threat intelligence cannot be used, the accuracy of estimating maliciousness may not be high.

The present disclosure has been made in view of the above-described circumstances, and an object is to highly accurately estimate maliciousness of cyber threat intelligence.

Means for Solving the Problem

In order to achieve the above-described object, an embodiment of the present disclosure provides an estimation device including: a collection section configured to collect, when cyber threat intelligence of a maliciousness estimation target is input, related information related to the cyber threat intelligence and other cyber threat intelligence different from the cyber threat intelligence; a feature generation section configured to generate, based on the related information, a feature representing a feature of the cyber threat intelligence; a graph information generation section configured to generate graph information based on the related information and the other cyber threat intelligence, the graph information indicating a graph in which each of the cyber threat intelligence and the other cyber threat intelligence is a node and a relationship between the nodes is an edge; and an estimation section configured to estimate the maliciousness of the cyber threat intelligence by a graph convolutional neural network using the feature of the cyber threat intelligence when a graph indicated by the graph information has a graph structure between the cyber threat intelligence and the other cyber threat intelligence.

Effects of the Invention

It is possible to highly accurately estimate the maliciousness of cyber threat intelligence.

DESCRIPTION OF EMBODIMENTS

Hereinafter, an embodiment of the present disclosure will be described. In the embodiment of the present disclosure, the maliciousness of target cyber threat intelligence is estimated using a graph convolutional neural network (GCN:

Graph Convolutional Networks or Graph Convolutional Neural Networks), by using a feature that represents a feature of the cyber threat intelligence, and a relationship (graph structure) between the cyber threat intelligence of a maliciousness estimation target (hereinafter, also referred to as "target cyber threat intelligence") and other cyber threat intelligence. Further, in the embodiment of the present disclosure, the maliciousness of the target cyber threat intelligence is estimated using a predetermined model obtained by learning in supervised learning using the feature, when the target cyber threat intelligence does not have a relationship with the other cyber threat intelligence (that is, the target cyber threat intelligence is independent on a graph and does not have a graph structure with other cyber threat intelligence).

Here, the following embodiment of the present disclosure will describe a maliciousness estimation system 1 by using the features of each cyber threat intelligence. The maliciousness estimation system 1 estimates maliciousness using a graph convolutional neural network when target cyber threat intelligence has a graph structure with other cyber threat intelligence and estimates maliciousness using a predetermined model obtained by learning in supervised learning when the target cyber threat intelligence does not have a graph structure with other cyber threat intelligence.

Overall Configuration of Maliciousness Estimation System 1

Figure 1:
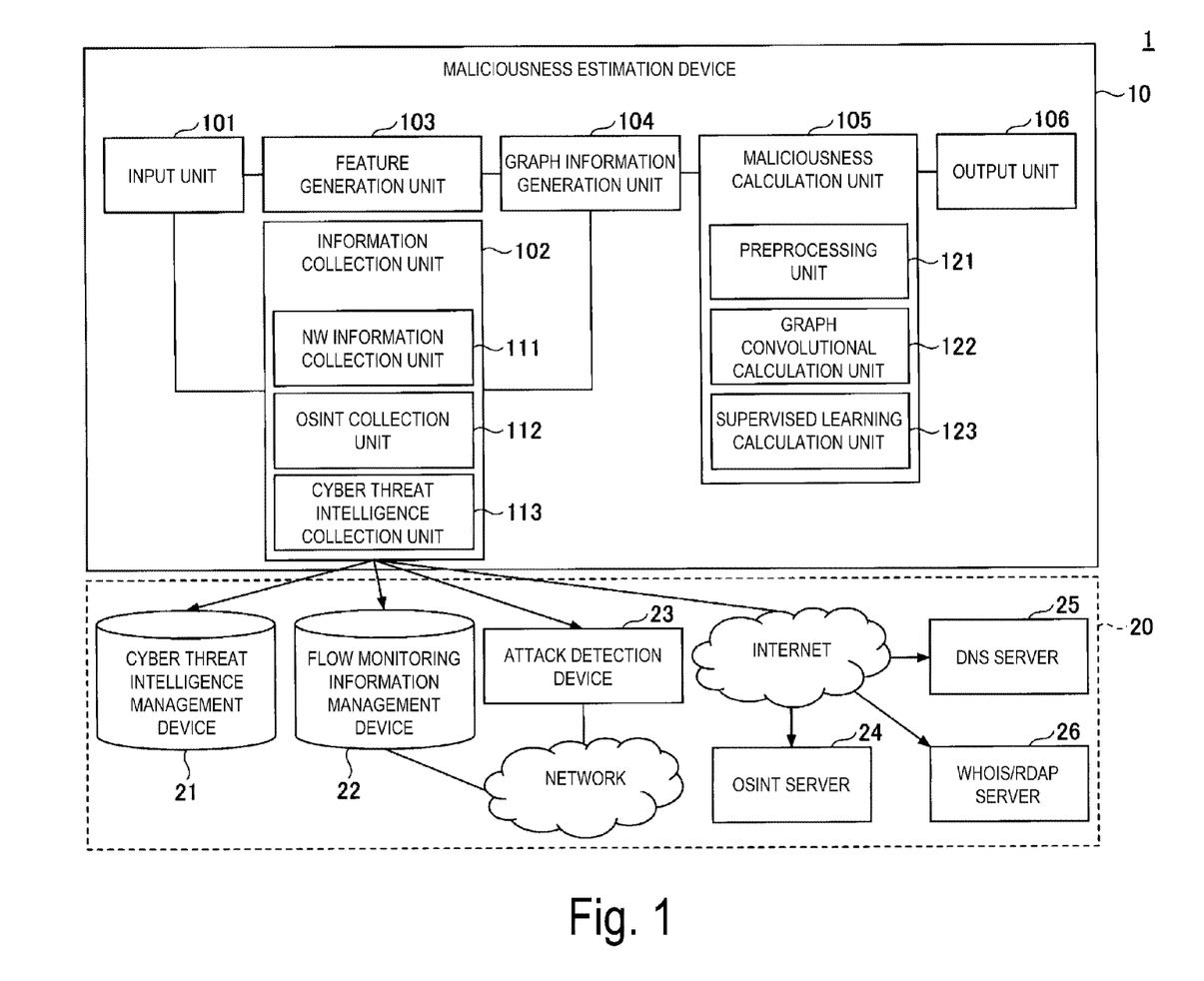
FIG. 1 is a diagram illustrating an example of an overall configuration of a maliciousness estimation system according to an embodiment of the present disclosure.

First, an overall configuration of the maliciousness estimation system 1 according to an embodiment of the present disclosure will be described with reference to FIG. 1. FIG. 1 is a diagram illustrating an example of an overall configuration of the maliciousness estimation system 1 according to the embodiment of the present disclosure.

As illustrated in FIG. 1, the maliciousness estimation system 1 according to the embodiment of the present disclosure includes a maliciousness estimation device 10 and various types of external devices 20. The maliciousness estimation device 10 and various types of external devices 20 are communicatively connected to each other via an arbitrary network (for example, the Internet or an in-house Local Area Network (LAN)). Here, examples of the external device 20 include a cyber threat intelligence management device 21, an information management device 22, an attack detection device 23, an OSINT server 24, a DNS server 25, a WHOIS/RDAP server 26, and the like.

When target cyber threat intelligence is input, the maliciousness estimation device 10 collects information related to the target cyber threat intelligence (hereinafter, also referred to as "related information"), other cyber threat intelligence, and the like and estimates maliciousness of the target cyber threat intelligence by using the target cyber threat intelligence, the related information, other cyber threat intelligence, and the like. In this case, the maliciousness estimation device 10 generates the feature of the target cyber threat intelligence, determines whether or not the target cyber threat intelligence has a graph structure with other cyber threat intelligence, and then estimates maliciousness of the target cyber threat intelligence by either a graph convolutional neural network or a predetermined model obtained by learning in supervised learning according to the determination result. Note that the other cyber threat intelligence means cyber threat intelligence other than the target cyber threat intelligence.

The cyber threat intelligence management device 21 is a database (DB) that stores and manages cyber threat intelligence registered, shared, analyzed, or used in the past (hereinafter, registration, sharing, analysis, and use are collectively referred to as "use, etc."). In addition to the cyber threat intelligence, the cyber threat intelligence management device 21 also stores and manages the maliciousness of the cyber threat intelligence (maliciousness estimated or set in the past) and the feature (feature generated in the past).

The flow monitoring information management device 22 is a DB that stores and manages flow monitoring information collected from a flow exporter, a flow collector, or the like on a network.

The attack detection device 23 is software or a network device for detecting and blocking cyber attacks, such as a fire wall or an Intrusion Detection System (IDS)/an Intrusion Prevention System (IPS).

The OSINT server 24 is a server that provides public information about open-source intelligence. The OSINT server 24 provides public information about open-source intelligence in the form of, for example, a webpage or the like.

The DNS server 25 is a server that performs name resolution (also referred to as "address resolution") between a domain name and an IP address.

The WHOIS/RDAP server 26 is a server that provides owner information of an IP address or a domain name.

Here, as illustrated in FIG. 1, the maliciousness estimation device 10 includes, as functional units, an input unit 101, an information collection unit 102, a feature generation unit 103, a graph information generation unit 104, a maliciousness calculation unit 105, and an output unit 106.

The input unit 101 inputs target cyber threat intelligence. Note that the input unit 101 may input the target cyber threat intelligence from an arbitrary input source which is determined in advance. For example, the input unit 101 may input the target cyber threat intelligence stored in a storage device such as a memory or may input the target cyber threat intelligence received from other devices connected via a network.

The information collection unit 102 collects related information and other cyber threat intelligence. Here, the information collection unit 102 includes a NW information collection unit 111, an OSINT collection unit 112, and a cyber threat intelligence collection unit 113.

The NW information collection unit 111 collects related information which can be observed on the network. For example, the NW information collection unit 111 may inquire of the flow monitoring information management device 22 and then collect the flow monitoring information related to the target cyber threat intelligence. Further, for example, the NW information collection unit 111 inquires of the DNS server 25 and collects information (name resolution result information) obtained by resolving a domain name or an IP address included in the target cyber threat intelligence. Similarly, for example, the NW information collection unit 111 inquires of the WHOIS/RDAP server 26 and collects the owner information of the domain name or the IP address included in the target cyber threat intelligence.

Note that, for example, the NW information collection unit 111 may inquire of the attack detection device 23 and collect alert information related to the target cyber threat intelligence as the related information. Because the alert information is also collected as the related information, the related information can be used, for example, in generating graph information from the graph structure showing the relationship among pieces of cyber threat intelligence (the target cyber threat intelligence and other cyber threat intelligence) or can be used as an evidence of the estimated maliciousness (that is, the maliciousness of the target cyber threat intelligence).

The OSINT collection unit 112 collects public information about open-source intelligence. That is, the OSINT collection unit 112 inquires of the OSINT server 24 and collects public information related to the target cyber threat intelligence. Examples of the public information collected by the OSINT collection unit 112 include information indicating an autonomous system (AS) number result, information indicating a search result of GeoIP, information obtained from a reputation service, and the like.

The cyber threat intelligence collection unit 113 collects other cyber threat intelligence. That is, the cyber threat intelligence collection unit 113 inquires of the cyber threat intelligence management device 21 and collects other cyber threat intelligence used in the past. Note that related information of other cyber threat intelligence may be also stored and managed in the cyber threat intelligence management device 21, and in this case, the cyber threat intelligence collection unit 113 may collect related information of other cyber threat intelligence in addition to the other cyber threat intelligence.

The feature generation unit 103 generates the feature of the target cyber threat intelligence by using a domain name, URL, or the like included in the target cyber threat intelligence and the related information collected by the NW information collection unit 111 or the OSINT collection unit 112.

The graph information generation unit 104 generates graph information (node information and graph information) from a graph structure indicating the relationship between pieces of the cyber threat intelligence (target cyber threat intelligence and other cyber threat intelligence) by using the target cyber threat intelligence and the related information and the other cyber threat intelligence that are collected by the information collection unit 102.

The maliciousness calculation unit 105 determines whether or not the target cyber threat intelligence has a graph structure with the other cyber threat intelligence by using the graph information generated by the graph information generation unit 104. Then, in response to the determination result, the maliciousness calculation unit 105 estimates maliciousness of the target cyber threat intelligence by either a graph convolutional neural network or a predetermined model obtained by learning in supervised learning, by using the feature of pieces of cyber threat intelligence (the target cyber threat intelligence and other cyber threat intelligence). Here, the maliciousness calculation unit 105 includes a preprocessing unit 121, a graph convolutional calculation unit 122, and a supervised-learning calculation unit 123.

As preprocessing, the preprocessing unit 121 divides a set of data indicating the feature of each cyber threat intelligence (hereinafter, also referred to as "feature data") into, for example, a teacher set, a verification set, and a test set. Here, the teacher set is a set of the feature data to be used in the graph convolutional neural network or learning a learning model in supervised learning. Further, the verification set is a set of the feature data to be used for verifying the learning result. On the other hand, the test set is a set of the feature data to be used for estimating maliciousness, and the feature data of the target cyber threat intelligence is included in the test set.

Then, the preprocessing unit 121 creates a plurality of pieces of teacher data from the teacher set and creates a plurality of pieces of verification data from the verification set. Further, the preprocessing unit 121 creates the test data from the test set. Here, the teacher data and the verification data are data to which a label indicating the maliciousness is given to the input data input to the graph convolutional neural network or the learning model in supervised learning. At this time, labels included in the teacher data and the verification data may be calculated from the maliciousness of the feature data constituting each of the teacher data and the verification data. On the other hand, the test data is input data which is input to the graph convolutional neural network or the learning model in supervised learning (that is, no label is given to the test data). Note that, for the feature data of other cyber threat intelligence and the maliciousness for giving labels to the teacher data and the verification data, those stored and managed in the cyber threat intelligence management device 21 are used.

The graph convolutional calculation unit 122 calculates (estimates) the maliciousness of the target cyber threat intelligence by the graph convolutional neural network using the input data (the teacher data, the verification data, and the test data) created by the preprocessing unit 121 and the graph information generated by the graph information generation unit 104.

The supervised-learning calculation unit 123 calculates (estimates) the maliciousness of the target cyber threat intelligence according to the method of supervised learning using the input data (the teacher data, the verification data, and the test data) created by the preprocessing unit 121.

The output unit 106 outputs the target cyber threat intelligence and the maliciousness calculated (estimated) by the maliciousness calculation unit 105. Note that the output unit 106 may output the target cyber threat intelligence and the maliciousness to an arbitrary output destination determined in advance. For example, the output unit 106 may use a display or the like as an output destination, may use a storage device such as a memory or the like as an output destination, or may use other devices (for example, the cyber threat intelligence management device 21 or the like) connected via the network as an output destination.

Hardware Configuration of Maliciousness Estimation Device 10

Figure 2:
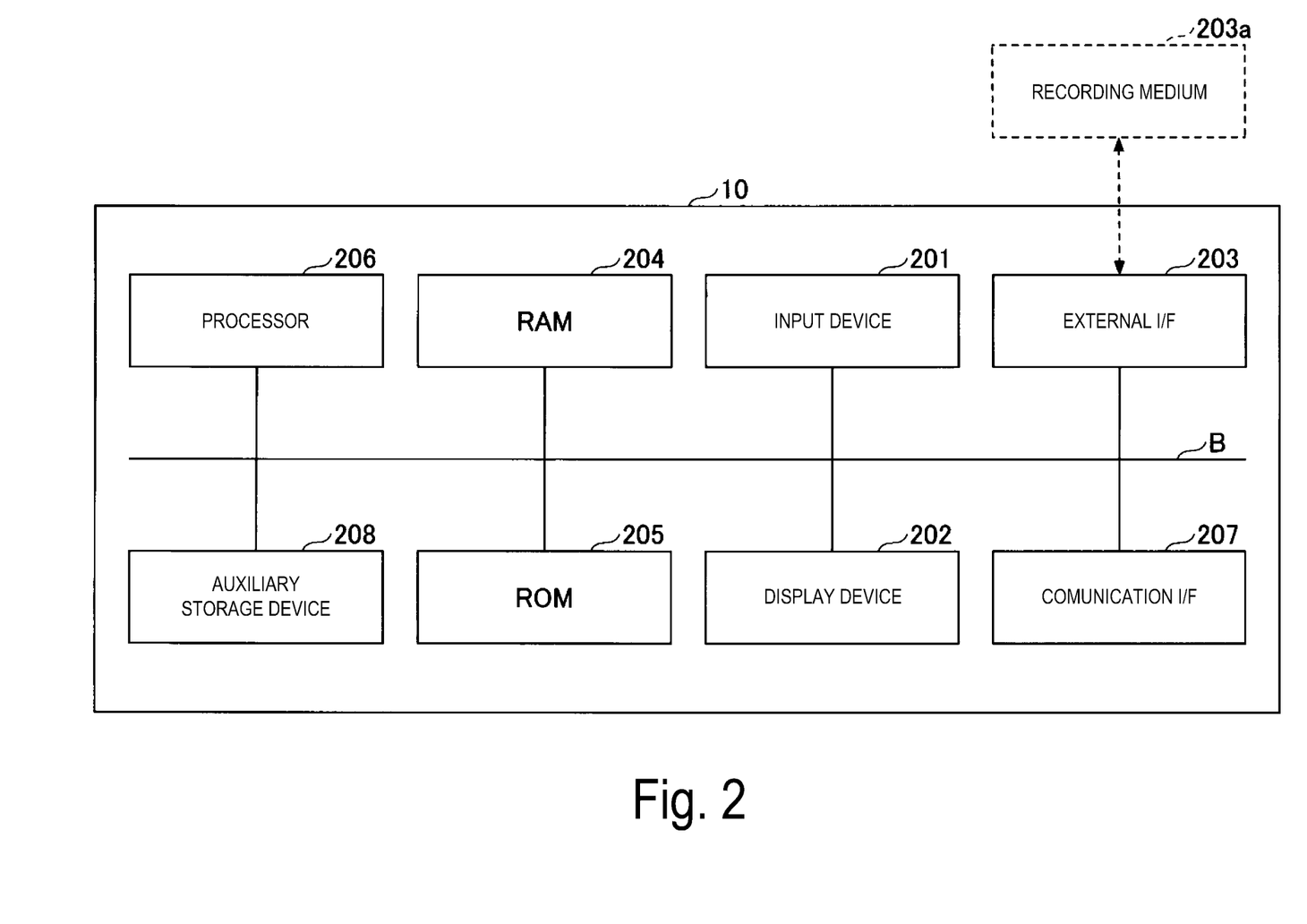
FIG. 2 is a diagram illustrating an example of a hardware configuration of a maliciousness estimation device according to the embodiment of the present disclosure.

Next, the hardware configuration of the maliciousness estimation device 10 according to the embodiment of the present disclosure will be described with reference to FIG. 2. FIG. 2 is a diagram illustrating an example of the hardware configuration of the maliciousness estimation device 10 according to the embodiment of the present disclosure.

As illustrated in FIG. 2, the maliciousness estimation device 10 according to the embodiment of the present disclosure includes, as hardware, an input device 201, a display device 202, an external I/F 203, a random access memory (RAM) 204, a read only memory (ROM) 205, a processor 206, a communication I/F 207, and an auxiliary storage device 208. These pieces of hardware are connected communicatively with each other via a bus B.

The input device 201 is, for example, a keyboard, a mouse, a touch panel, or the like and is used when a user inputs various operations. The display device 202 is, for example, a display or the like and displays processing results (for example, the estimated maliciousness or the like) by the maliciousness estimation device 10. Note that the maliciousness estimation device 10 may not include at least one of the input device 201 and the display device 202.

The external I/F 203 is an interface with an external recording medium such as a recording medium 203a. The maliciousness estimation device 10 can read from or write to the recording medium 203a via the external I/F 203. The recording medium 203a may store one or more programs and the like that realize each of the functional units (for example, the input unit 101, the information collection unit 102, the feature generation unit 103, the graph information generation unit 104, the maliciousness calculation unit 105, the output unit 106, and the like) included in the maliciousness estimation device 10.

Examples of the recording medium 203*a* include a flexible disk, a compact disc (CD), a digital versatile disk (DVD), a secure digital memory card (SD memory card), a universal serial bus (USB) memory card, and the like.

The RAM 204 is a volatile semiconductor memory that temporarily holds programs and data. The ROM 205 is a non-volatile semiconductor memory that can hold programs and data even when the power is turned off. The ROM 205 stores, for example, setting information related to an operating system (OS), setting information related to a communication network, and the like.

The processor 206 is, for example, a central processing unit (CPU), a graphics processing unit (GPU), or the like and is an arithmetic device which reads out a program or data from the ROM 205, the auxiliary storage device 208, or the like onto the RAM 204 to perform processing. Each of the functional units included in the maliciousness estimation device 10 is realized by reading out one or more programs stored in the ROM 205, the auxiliary storage device 208, or the like onto the RAM 204 and performing processing by the processor 206.

The communication I/F 207 is an interface for connecting the maliciousness estimation device 10 to the communication network. One or more programs that realize each of the functional units including in the maliciousness estimation device 10 may be acquired (downloaded) from a predetermined server or the like via the communication I/F 207.

The auxiliary storage device 208 is, for example, a hard disk drive (HDD), a solid state drive (SSD), or the like and is a non-volatile storage device that stores a program or data. Examples of the program or data stored in the auxiliary storage device 208 include an OS, an application program that realizes various functions on the OS, and one or more programs that realize each of the functional units included in the maliciousness estimation device 10.

The maliciousness estimation device 10 according to the embodiment of the present disclosure can realize various processes to be described later by including the hardware configuration illustrated in FIG. 2. Note that, in the example illustrated in FIG. 2, a case is shown in which the maliciousness estimation device 10 according to the embodiment of the present disclosure is realized by a single device (computer), but the present disclosure is not limited thereto. The maliciousness estimation device 10 of the embodiment of the present disclosure may be realized by a plurality of devices (computers). Further, a single device (computer) may include a plurality of the processors 206 or a plurality of memories (the RAM 204, the ROM 205, the auxiliary storage device 208, and the like).

Maliciousness Estimation Process

Figure 3:
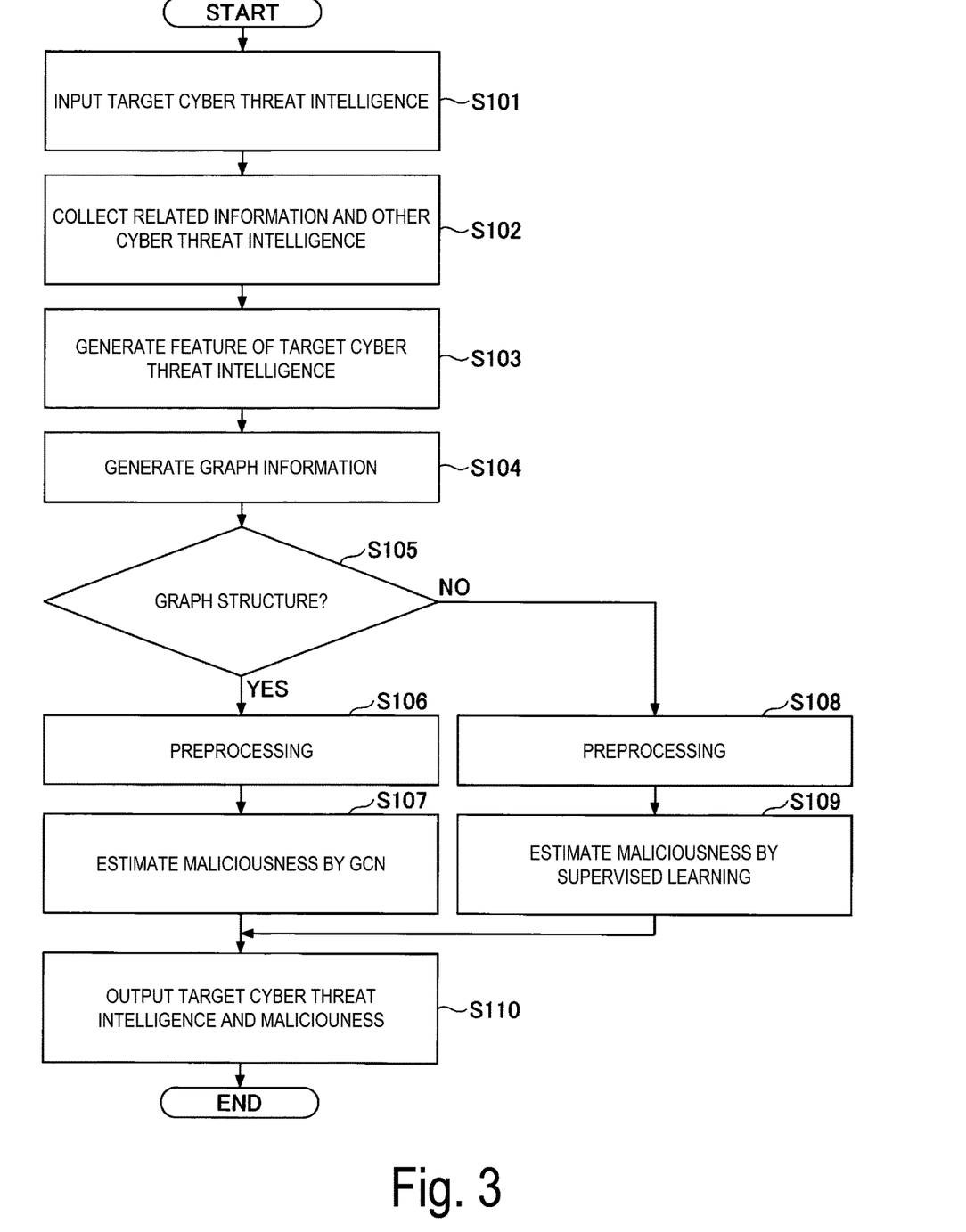
FIG. 3 is a flowchart illustrating an example of a maliciousness estimation process according to the embodiment of the present disclosure.

Next, a process (maliciousness estimation process) of estimating maliciousness of the target cyber threat intelligence will be described with reference to FIG. 3. FIG. 3 is a flowchart illustrating an example of the maliciousness estimation process according to the embodiment of the present disclosure.

Step S101: First, the input unit 101 inputs the target cyber threat intelligence.

Step S102: Next, the information collection unit 102 collects the related information and other cyber threat intelligence. That is, the information collection unit 102 collects, by the NW information collection unit 111, the related information which can be monitored in the network from the flow monitoring information management device 22, the attack detection device 23, the DNS server 25, the WHOIS/RDAP server 26, and the like. At the same time, the information collection unit 102 collects public information about open-source intelligence as related information from the OSINT server 27 by using the OSINT collection unit 112. Further, the information collection unit 102 collects other cyber threat intelligence from the cyber threat intelligence management device 21 by the cyber threat intelligence collection unit 113.

Note that the related information and the other cyber threat intelligence collected in step S102 described above are stored in, for example, the auxiliary storage device 208 or the like of the maliciousness estimation device 10.

Step S103: Next, the feature generation unit 103 generates the feature of the target cyber threat intelligence by using the domain name, URL, or the like included in the target cyber threat intelligence and the related information collected by the NW information collection unit 111 and the OSINT collection unit 112. Here, the feature is represented by, for example, a vector whose elements are numerical values of various features of the cyber threat intelligence.

Examples of the features of the cyber threat intelligence include the following.

Length of a character string of a domain name and a URL included in cyber threat intelligence Percentage of numbers in a domain name and a URL included in cyber threat intelligence Percentage of consonants in a domain name and a URL included in cyber threat intelligence Whether or not a domain name and a URL included in cyber threat intelligence contain a predetermined characteristic character string (for example, character string "exe")

The number of A records or NS records included in name resolution result information Country-specific information about an IP address included in cyber threat intelligence The related information may be used to quantify each of these features. For example, in quantifying the country-specific information of the IP address included in the cyber threat intelligence, information indicating a search result of GeoIP or the like may be used.

Accordingly, for example, when the numerical values of each feature of the target cyber threat intelligence are $x_1, x_2, \ldots, x_N$, vectors $[x_1, x_2, \ldots, x_N]$, whose elements are $x_1, x_2, \ldots, x_N$ are generated as the feature of the target cyber threat intelligence. Here, N is a value determined in advance and indicates the number of features of the cyber threat intelligence. In addition, for example, in the case of quantifying whether or not a predetermined characteristic character string is included in a domain name or a URL, One-hot Encoder or the like may be used.

Note that this feature of the cyber threat intelligence is an example, and various features may be used in addition to the above-described feature.

Step S104: Next, the graph information generation unit 104 generates graph information from a graph structure indicating the relationship between pieces of the cyber threat intelligence (the target cyber threat intelligence and the other cyber threat intelligence) by using the target cyber threat intelligence and the related information and the other cyber threat intelligence which are collected in step S102 described above. Here, the graph information generation unit 104 generates the graph information by using the cyber threat intelligence (the target cyber threat intelligence and the other cyber threat intelligence) as a node and the relationship between the pieces of the cyber threat intelligence (nodes) as an edge. Note that the related information of the other cyber threat intelligence may be collected from, for example, the cyber threat intelligence management device 21 in step S102 described above, or the related information stored and managed in the cyber threat intelligence management device 21 in this step may be referred to or collected.

Examples of the related cyber threat intelligence include the following.

At least two cyber threat intelligence including an IP address obtained as a result of forward lookup of a same domain name For example, when an IP address A and an IP address B are obtained as a result of a forward lookup of a certain domain name, cyber threat intelligence A including the IP address A and cyber threat intelligence B including the IP address B become related cyber threat intelligence.

At least two cyber threat intelligence including domain names sharing a same IP address For example, when a domain name C and a domain name D share the same IP address, cyber threat intelligence C including the domain name C and cyber threat intelligence D including the domain name D become related cyber threat intelligences.

At least two cyber threat intelligence including domain names with a same company name or register name obtained as an inquiry result of WHOIS or RDAP For example, when a domain name E and a domain name F are the same company name as an inquiry result of WHOIS or RDAP, cyber threat intelligence E including the domain name E and cyber threat intelligence F including the domain name F become related cyber threat intelligence.

Accordingly, a graph structure in which each cyber threat intelligence is a node and an edge is between the nodes of the related cyber threat intelligences can be obtained and the graph information generation unit 104 can generate graph information indicating the graph structure. Examples of the graph information include an adjacency matrix, a graph Laplacian, and the like.

Step S105: Next, the maliciousness calculation unit 105 determines whether or not the target cyber threat intelligence has the graph structure with other cyber threat intelligence by using the graph information created in step S104 described above. That is, the maliciousness calculation unit 105 determines whether or not the node indicating the target cyber threat intelligence is connected to other nodes (that is, the nodes indicating other cyber threat intelligences) at the edge.

When it is determined that the target cyber threat intelligence has the graph structure with other cyber threat intelligence in step S105, the maliciousness calculation unit 105 proceeds to step S106. On the other hand, when it is determined that the target cyber threat intelligence does not have the graph structure with other cyber threat intelligence (that is, when the node indicating the target cyber threat intelligence is independent on the graph), the maliciousness calculation unit 105 proceeds to step S108.

Step S106: When it is determined that the target cyber threat intelligence has the graph structure with other cyber threat intelligence in step S105 described above, the maliciousness calculation unit 105 divides the feature data of each cyber threat intelligence into a teacher set, a verification set, and a test set by the preprocessing unit 121. Here, the preprocessing unit 121 may divide the feature data randomly, for example, so that the number of feature data included in the teacher set, the number of feature data included in the verification set, and the number of feature data included in the test set become a preset ratio (a ratio to the total number of feature data). Additionally, as described above, the test set includes the feature data of the target cyber threat intelligence (that is, data indicating the feature generated in step S104 described above).

Then, the preprocessing unit 121 creates a plurality of teacher data from the teacher set and creates a plurality of verification data from the verification set. Further, the preprocessing unit 121 creates test data from the test set. Note that the maliciousness of the label given to a certain teacher data may be, for example, the average of the maliciousness of the feature data constituting the teacher data. The same applies to the verification data.

Step S107: Next, the maliciousness calculation unit 105 calculates (estimates) the maliciousness of the target cyber threat intelligence by the graph convolutional neural network using the input data (the teacher data, the verification data, and the test data) created in step S106 described above and the graph information generated in step S104 described above by the graph convolutional calculation unit 122. In the graph convolutional neural network, when t is an index indicating the layer of the graph convolutional neural network, t=0 is an input layer, and t=T−1 is an output layer, the maliciousness is estimated by the following equation (1) for t=0, . . . , T−1.

$$H^{(t+1)} = \sigma(AH^{(t)}W^{(t)}) \tag{1}$$

Here, A is the graph information, $W^{(t)}$ is the parameter (weight) of the t-th layer, and is the activation function. Further, $X=H^{(0)}$ is the input data and a matrix composed of a predetermined number of feature data (for example, an M×N matrix if the predetermined number is M and the feature data is an Nth-order horizontal vector). Note that, as the activation function σ, for example, a softmax function that outputs the maliciousness in the output layer using ReLU or the like other than the output layer (that is, a softmax function that outputs p and 1-p, where p is the maliciousness) is used.

At this time, the graph convolutional calculation unit 122 estimates maliciousness by the followings (1-1) to (1-3).

(1-1) First, the graph convolutional calculation unit 122 updates each parameter (weight) $W^{(t)}$ of the graph convolutional neural network by using each of the plurality of teacher data as the input data. That is, the maliciousness calculation unit 105 updates each parameter Wm by a known optimization method so that a predetermined error function (the error function may be referred to as an "objective function", "loss function", etc.) is minimized using the output result of the graph convolutional neural network when the label given to the teacher data and the teacher data are the input data.

(1-2) Next, the graph convolutional calculation unit 122 verifies the estimation accuracy of the graph convolutional neural network by using each of the plurality of verification data as the input data. That is, the maliciousness calculation unit 105 verifies the estimation accuracy of the graph convolutional neural network by a known verification method using the output result of the graph convolutional neural network when the label given to the verification data and the verification data are the input data. In addition, for example, when the estimation accuracy of the graph convolutional neural network is not sufficient as a result of verification, it is possible to change the ratio of the learning set and the verification set and to perform the process again from step S106 described above.

(1-3) Finally, the graph convolutional calculation unit 122 obtains an output result of the graph convolutional neural network by using the test data as the input data. This output result is the estimation result of the maliciousness of the target cyber threat intelligence.

Note that, the above-described (1-2) may not be necessarily performed. In this case, the verification data may not be generated in step S106.

Step S108: When it is determined that the target cyber threat intelligence does not have the graph structure with other cyber threat intelligence in step S105 described above, the maliciousness calculation unit 105 divides the feature data of each cyber threat intelligence into the teacher set, the verification set, and the test set and creates a plurality of teacher data, a plurality of verification data, and test data by the preprocessing unit 121 as in step S106 described above.

However, for example, the ratio of the number of feature data included in the teacher set, the number of feature data included in the verification set, and the number of feature data included in the test set may be different from that of step S105 described above. That is, different values may be set as a ratio in step S105 described above and in this step. For example, the feature data of each cyber threat intelligence itself becomes the input data depending on the model used in the method of supervised learning. In such a case, a ratio is set so that the number of feature data included in the test set becomes "1".

Step S109: Next, the maliciousness calculation unit 105 calculates (estimates) the maliciousness of the target cyber threat intelligence according to the method of supervised learning by the supervised learning calculation unit 123 by using the input data (the teacher data, the verification data, and the test data) created in step S108 described above.

Here, an arbitrary learning model can be used as a model (learning model) used in the method of supervised learning. For example, examples of the learning model include a support vector machine, a decision tree, and a learning model applied to ensemble learning (bagging and boosting).

At this time, the supervised learning calculation unit 123 estimates maliciousness by the followings (2-1) to (2-3).

(2-1) First, the supervised learning calculation unit 123 learns a learning model by the method of supervised learning using each of the plurality of teacher data as the input data.

(2-2) Next, the supervised learning calculation unit 123 verifies the estimation accuracy of the learning model by the existing verification method using each of the plurality of verification data as the input data. In addition, for example, when the estimation accuracy of the learning model is not sufficient as a result of verification, it is possible to change the ratio of the learning set and the verification set and to perform the processes again from step S108 described above.

(2-3) Finally, the supervised learning calculation unit 123 obtains an output result of the learning model by using the test data as the input data. This output result is the estimation result of the maliciousness of the target cyber threat intelligence.

Note that the above-described (2-2) may not be necessarily performed. In this case, the verification data may not be created in step S108 described above.

Step S110: After step S107 or step S109, the output unit 106 outputs the target cyber threat intelligence and the maliciousness estimated in step S107 or step S109 described above. Note that, for example, when the maliciousness estimated in step S107 or step S109 described above exceeds a predetermined threshold value, the output unit 106 may perform this step.

Further, for example, when the maliciousness estimated in step S107 or step S109 described above exceeds a predetermined threshold value, the output unit 106 may transmit a predetermined notification to the terminal of the security operator or the like.

Further, the output unit 106 may output, for example, a graph including a node indicating the target cyber threat intelligence, the feature of the target cyber threat intelligence, and the like in addition to the target cyber threat intelligence and the maliciousness. In this case, the output unit 106 may output the cyber threat intelligence in a predetermined format (for example, a standard description format such as a structured threat information expression (STIX) format).

Summary

As described above, the maliciousness estimation device 10 according to the embodiment of the present disclosure collects various related information or cyber threat intelligences, determines whether or not the target cyber threat intelligence has a graph structure with other cyber threat intelligence, and in response to the determination result, estimates maliciousness of the target cyber threat intelligence using a graph convolutional neural network or a predetermined model obtained by learning in supervised learning and the feature of each cyber threat intelligence. Accordingly, when the target cyber threat intelligence has a graph structure with other cyber threat intelligence, it is possible to estimate the maliciousness with extremely high accuracy by using the feature of the target cyber threat intelligence and the graph structure. On the other hand, even when the target cyber threat intelligence does not have the graph structure with other cyber threat intelligence, it is possible to highly accurately estimate the maliciousness by using the feature of the target cyber threat intelligence.

As a result, it is possible to detect and handle various cyber attacks at an earlier timing with high accuracy by using the maliciousness estimation device 10 according to the embodiment of the present disclosure. Further, it is possible to perform efficient security operations by reducing the operator's burden required for analysis and selection of a large amount of cyber threat intelligence and reducing false detection.

The present disclosure is not limited to the above-described specific embodiments and can be modified or changed in various forms without departing from claims.

REFERENCE SIGNS LIST

1 Maliciousness estimation system
10 Maliciousness estimation device
20 External device
21 Cyber threat intelligence management device
22 Flow monitoring information management device
23 Attack detection device
24 OSINT server
25 DNS server
26 WHOIS/RDAP server
101 Input unit
102 Information collection unit
103 Feature generation unit
104 Graph information generation unit
105 Maliciousness calculation unit
106 Output unit
111 NW information collection unit
112 OSINT collection unit
113 Cyber threat intelligence collection unit
121 Preprocessing unit 122 Graph convolutional calculation unit
123 Supervised learning calculation unit

The invention claimed is:

1. An estimation device, comprising one or more processors configured to perform operations comprising:
receiving target cyber threat intelligence that is a target of a maliciousness estimation;
collecting (i) related information of the target cyber threat intelligence and (ii) other cyber threat intelligence different from the cyber threat intelligence;
generating a feature of the target cyber threat intelligence based on the collected related information of the target cyber threat intelligence and information included in the target cyber threat intelligence;
generating graph information based on (i) the related information of the target cyber threat intelligence and (ii) the other cyber threat intelligence, the graph information indicating a graph in which each of the cyber threat intelligence and the other cyber threat intelligence is represented as a node;
determining, based on the graph information, whether there is a relationship between the target cyber threat intelligence and the other cyber threat intelligence;
in response to determining that there is a relationship, estimating maliciousness of the target cyber threat intelligence by a graph convolutional neural network using the feature of the target cyber threat intelligence; and
in response to determining that there is not a relationship, estimating the maliciousness of the target cyber threat intelligence using a predetermined learning model obtained with supervised learning.

2. The estimation device according to claim 1, wherein
collecting the related information comprises: collecting at least one or more pieces of information among flow monitoring information collectable from a flow exporter and/or a flow collector, public information collectable from a server or Web site providing open-source intelligence, name resolution information collectable from a DNS server, and owner information collectable from a WHOIS server or RDAP server, and
generating the feature comprises: generating the feature based on the at least one or more pieces of information collected.

3. The estimation device according to claim 1, wherein
the maliciousness of the cyber threat intelligence is estimated by the predetermined learning model, using a feature amount of the target cyber threat intelligence.

4. The estimation device according to claim 1,
wherein the feature includes at least one or more of:
a length of a character string of a domain name included in the cyber threat intelligence; a length of a character string of an URL included in the cyber threat intelligence; a percentage of numbers in the domain name included in the cyber threat intelligence; a percentage of numbers in the URL included in the cyber threat intelligence; a percentage of consonants in the domain name included in the cyber threat intelligence; a percentage of consonants in the URL included in the cyber threat intelligence; information about whether or not a predetermined character string is included in the domain name included in the cyber threat intelligence; information about whether or not a predetermined character string is included in the URL included in the cyber threat intelligence; country-specific information of an IP address included in the cyber threat intelligence; and a number of A records and NS records when the IP address or domain name included in the cyber threat intelligence is resolved.

5. An estimation method that is performed by a computer, the estimation method comprising:
receiving target cyber threat intelligence that is a target of a maliciousness estimation;
collecting (i) related information of the target cyber threat intelligence and (ii) other cyber threat intelligence different from the cyber threat intelligence;
generating a feature of the target cyber threat intelligence based on the related information;
generating graph information based on (i) the related information of the target cyber threat intelligence and (ii) the other cyber threat intelligence, the graph information representing a graph in which each of the cyber threat intelligence and the other cyber threat intelligence is a node;
determining, based on the graph information, whether there is a relationship between the target cyber threat intelligence and the other cyber threat intelligence;
in response to determining that there is a relationship, estimating maliciousness of the target cyber threat intelligence by a graph convolutional neural network using the feature of the target cyber threat intelligence; and
in response to determining that there is not a relationship, estimating the maliciousness of the target cyber threat intelligence using a predetermined learning model obtained with supervised learning.

6. A non-transitory computer readable medium storing one or more instructions that cause a computer to execute:
receiving target cyber threat intelligence that is a target of a maliciousness estimation;
collecting (i) related information of the target cyber threat intelligence and (ii) other cyber threat intelligence different from the cyber threat intelligence;
generating a feature of the target cyber threat intelligence based on the related information;
generating graph information based on (i) the related information of the target cyber threat intelligence and (ii) the other cyber threat intelligence, the graph information representing a graph in which each of the cyber threat intelligence and the other cyber threat intelligence is a node;
determining, based on the graph information, whether there is a relationship between the target cyber threat intelligence and the other cyber threat intelligence;
in response to determining that there is a relationship, estimating maliciousness of the target cyber threat intelligence by a graph convolutional neural network using the feature of the target cyber threat intelligence; and
in response to determining that there is not a relationship, estimating the maliciousness of the target cyber threat intelligence using a predetermined learning model obtained with supervised learning.

7. The estimation method according to claim 5, further comprising:
collecting, as the related information, at least one or more pieces of information among flow monitoring information collectable from a flow exporter and/or a flow collector, public information collectable from a server or Web site providing open-source intelligence, name resolution information collectable from a DNS server, and owner information collectable from a WHOIS server or RDAP server; and generating the feature based on the at least one or more pieces of information collected.

8. The estimation method according to claim 5, further comprising:
estimating the maliciousness of the cyber threat intelligence by the predetermined learning model, using a feature amount of the target cyber threat intelligence.

9. The estimation method according to claim 5, wherein the feature includes at least one or more of:
a length of a character string of a domain name included in the cyber threat intelligence; a length of a character string of an URL included in the cyber threat intelligence; a percentage of numbers in the domain name included in the cyber threat intelligence; a percentage of numbers in the URL included in the cyber threat intelligence; a percentage of consonants in the domain name included in the cyber threat intelligence; a percentage of consonants in the URL included in the cyber threat intelligence; information about whether or not a predetermined character string is included in the domain name included in the cyber threat intelligence; information about whether or not a predetermined character string is included in the URL included in the cyber threat intelligence; country-specific information of an IP address included in the cyber threat intelligence; and a number of A records and NS records when the IP address or domain name included in the cyber threat intelligence is resolved.

10. The non-transitory computer readable medium according to claim 6, wherein the one or more instructions further cause the computer to execute:
collecting, as the related information, at least one or more pieces of information among flow monitoring information collectable from a flow exporter and/or a flow collector, public information collectable from a server or Web site providing open-source intelligence, name resolution information collectable from a DNS server, and owner information collectable from a WHOIS server or RDAP server; and
generating the feature based on the at least one or more pieces of information collected.

11. The non-transitory computer readable medium according to claim 6, wherein the one or more instructions further cause the computer to execute:
estimating the maliciousness of the cyber threat intelligence by the predetermined learning model, using a feature amount of the target cyber threat intelligence.

12. The non-transitory computer readable medium according to claim 6, wherein the feature includes at least one or more of:
a length of a character string of a domain name included in the cyber threat intelligence; a length of a character string of an URL included in the cyber threat intelligence; a percentage of numbers in the domain name included in the cyber threat intelligence; a percentage of numbers in the URL included in the cyber threat intelligence; a percentage of consonants in the domain name included in the cyber threat intelligence; a percentage of consonants in the URL included in the cyber threat intelligence; information about whether or not a predetermined character string is included in the domain name included in the cyber threat intelligence; information about whether or not a predetermined character string is included in the URL included in the cyber threat intelligence; country-specific information of an IP address included in the cyber threat intelligence; and a number of A records and NS records when the IP address or domain name included in the cyber threat intelligence is resolved.

* * * * *